United States Patent

[11] 3,576,204

| [72] | Inventor | Cornelis Van Der Lely<br>7, Bruschenrain, Zug, Switzerland |
|---|---|---|
| [21] | Appl. No. | 693,825 |
| [22] | Filed | Dec. 27, 1967 |
| [45] | Patented | Apr. 27, 1971 |
| [32] | Priority | Jan. 11, 1967 |
| [33] | | Netherlands |
| [31] | | 6,700,363 |

[54] FODDER-LOOSENING IMPLEMENT
17 Claims, 7 Drawing Figs.

[52] U.S. Cl. ........................................... 146/70.1
[51] Int. Cl. ..................................... A01f 29/00, A01f 31/00
[50] Field of Search........................................ 146/70.1

[56] References Cited
UNITED STATES PATENTS

| 2,518,237 | 8/1950 | Inskeep | (146/70.1UX) |
| 3,129,739 | 4/1964 | Wenger | 146/70.1 |

*Primary Examiner*—Willie G. Abercrombie
*Attorney*—Mason, Mason and Albright

ABSTRACT: A fodder-loosening implement has a floor conveyor and rotatable gripping tines which move bales of crop from a conveyor to within a confining passageway. A second set of faster-moving tines operates from a second direction to tear bales apart while they are held in the passageway. A motor is connected to move the tines and to propel the implement.

FODDER-LOOSENING IMPLEMENT

This invention relates to an implement for loosening hay, straw and other fodder from bales. A primary purpose of this is to enable such fodder to be eaten without difficulty by cattle and other farmyard animals.

The term "bale" is to be interpreted throughout this specification as including any unit of fodder in a compressed and/or caked and/or tied and/or bundled form and is not limited to bales of the kind conventionally produced by an agricultural baling machine.

According to the invention there is provided a fodder-loosening implement comprising a frame and means movable relative to said frame and also relative to a bale of fodder carried by the implement to loosen fodder and detach it from the bale.

Figure 1:
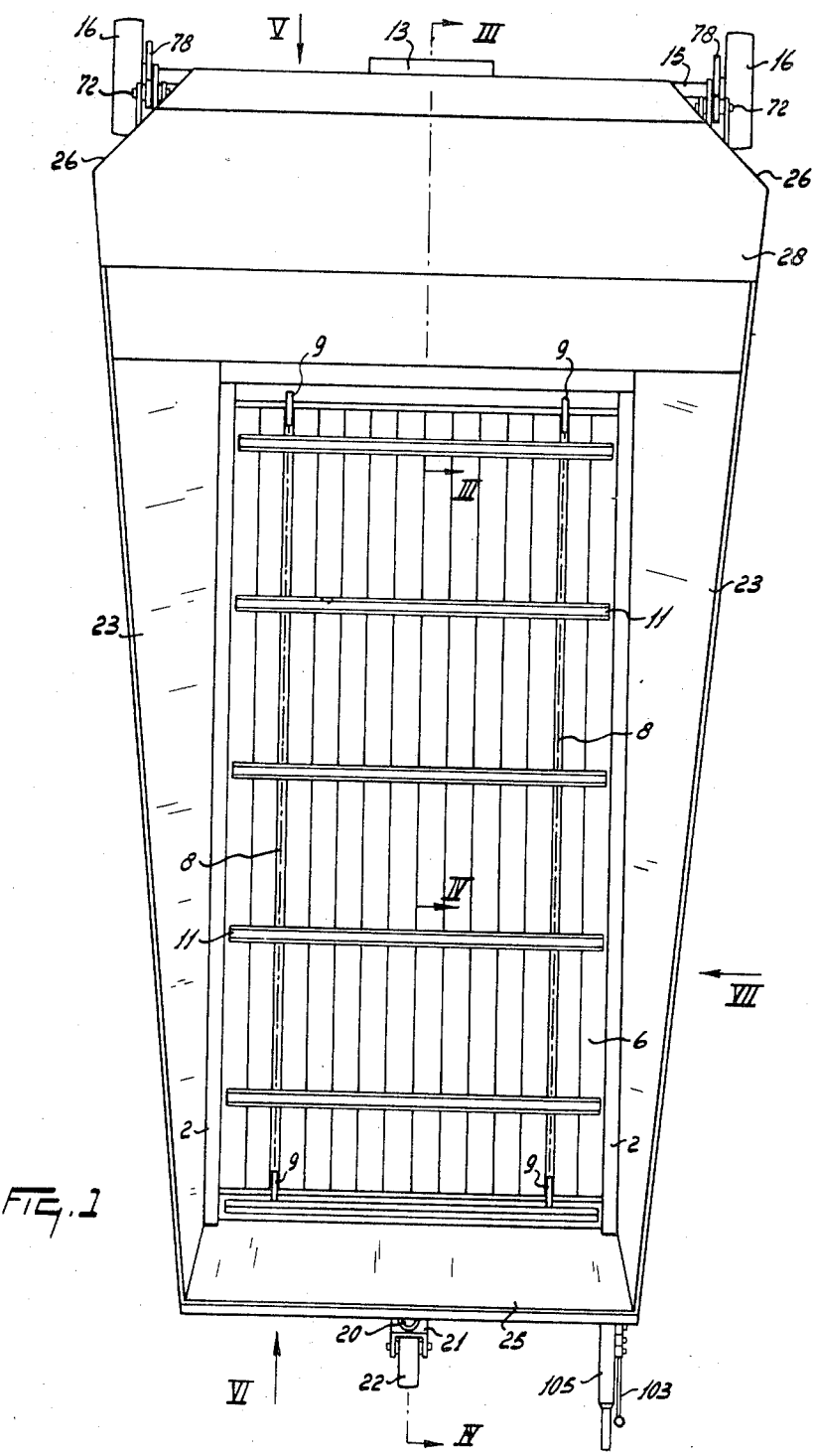
Figure 2:
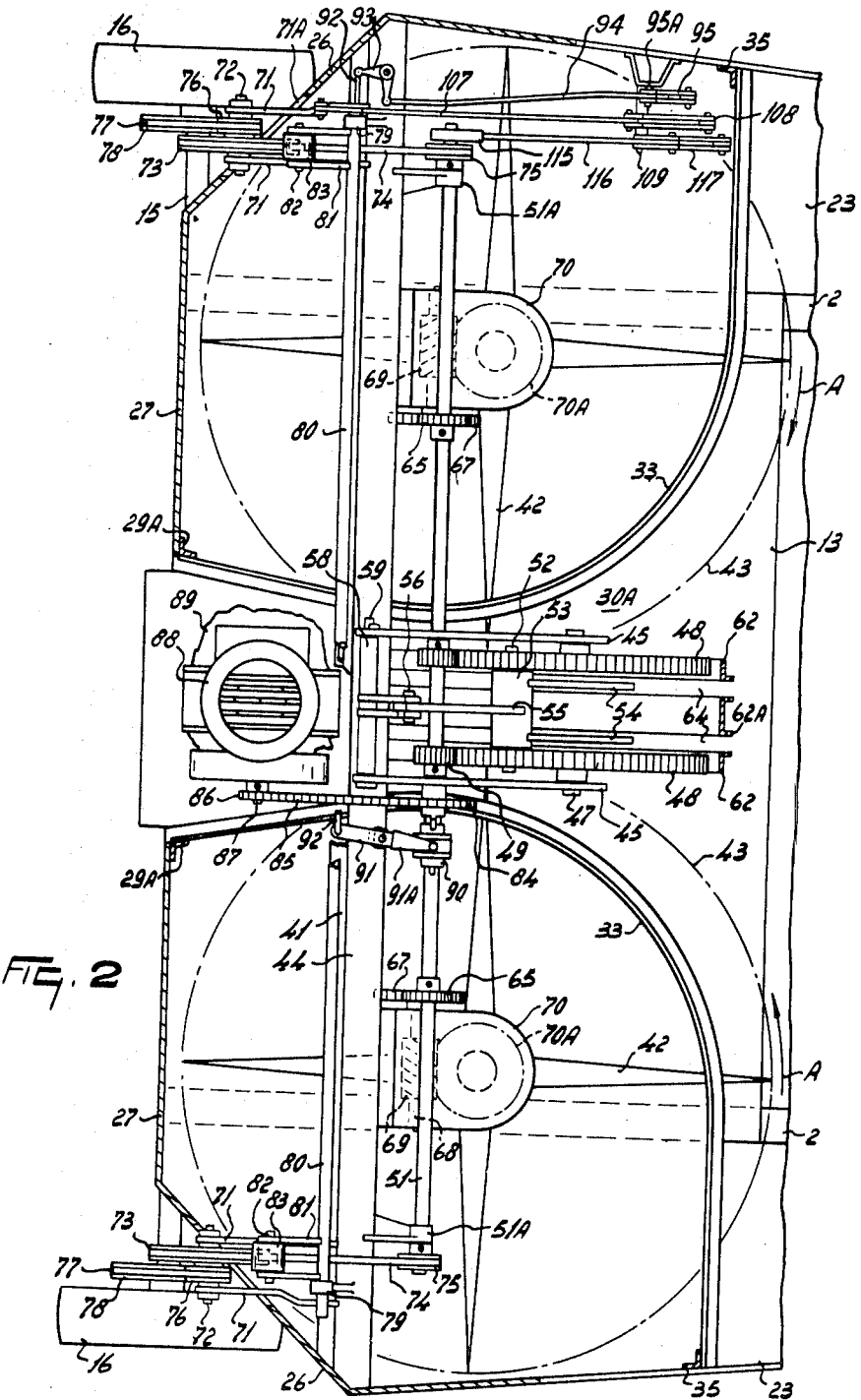
Figure 3:
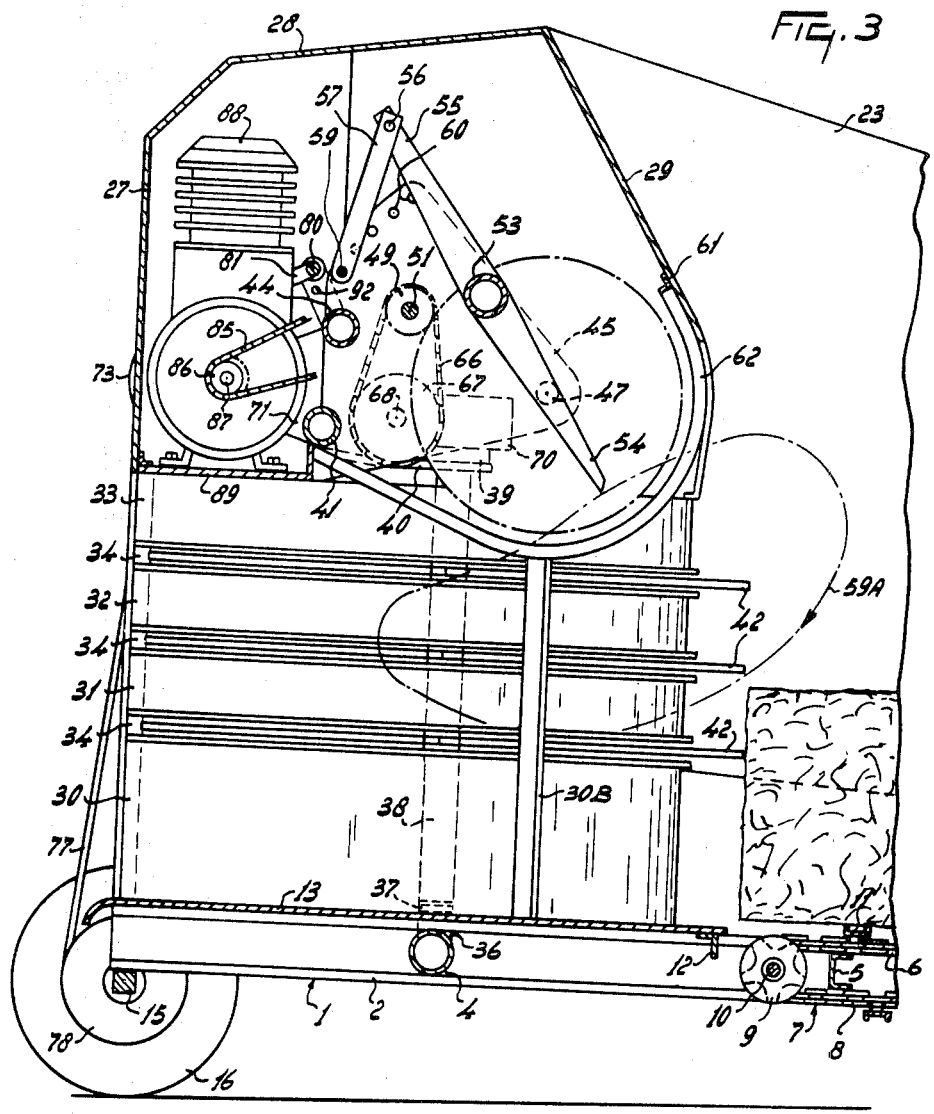
Figure 4:
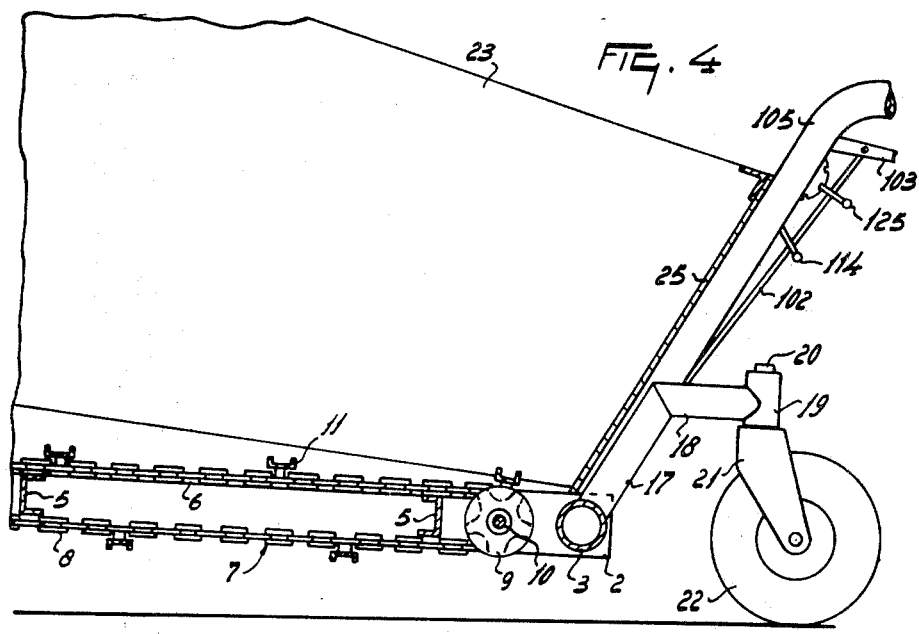
Figure 5:
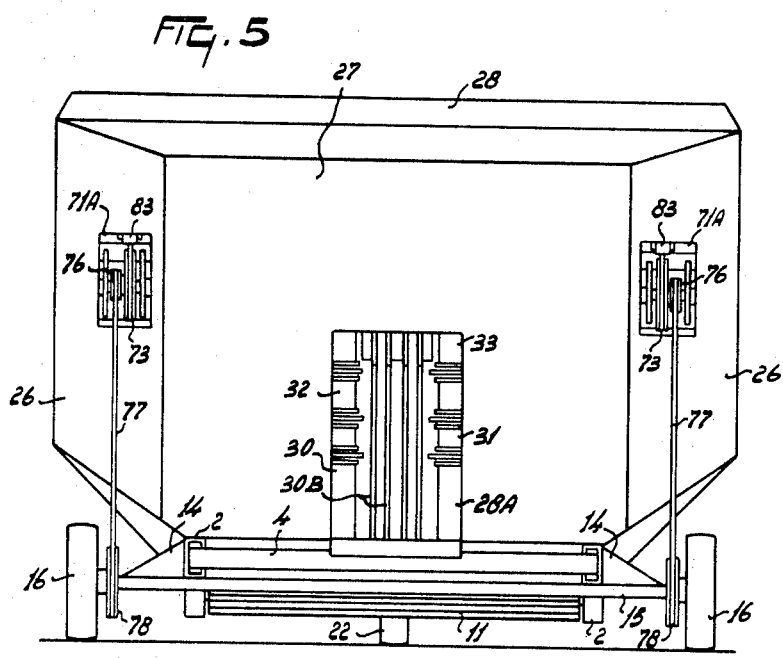
Figure 6:
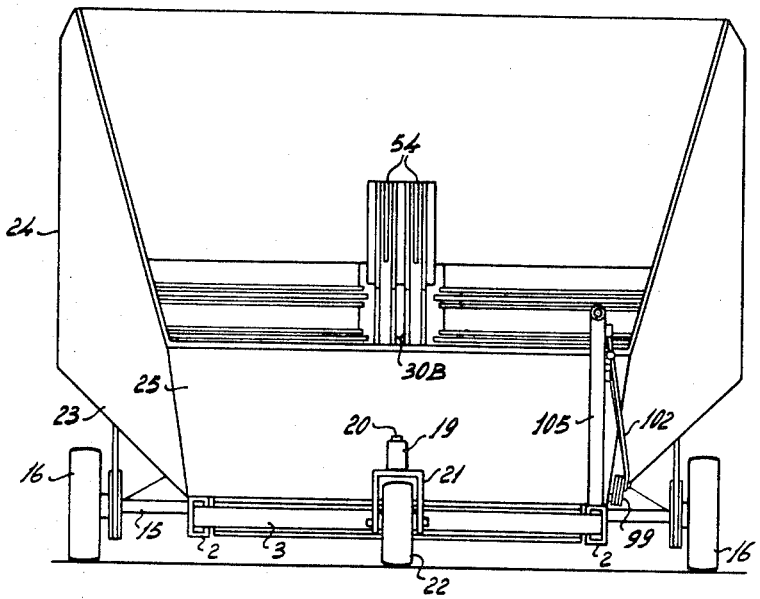
Figure 7:
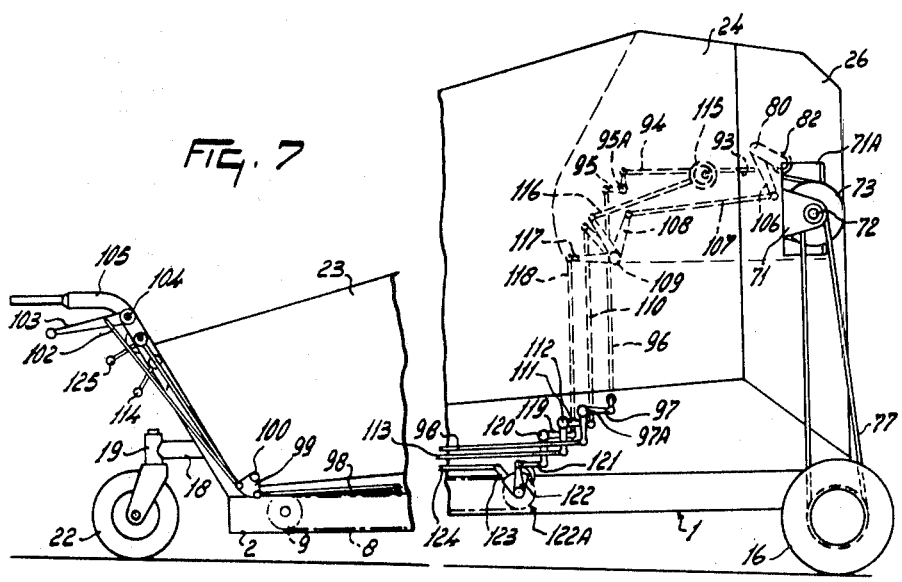

For a better understanding of the invention, and to show how the same may be carried into effect, reference will now be made, by way of example, to the accompanying drawings, in which:

FIG. 1 is a plan view of an implement in accordance with the invention,

FIG. 2 is a plan view, to an enlarged scale, omitting a concealing part illustrated in FIG. 1, FIG. 3 is a section, to an enlarged scale, taken on the line III—III of FIG. 1, FIG. 4 is a section, to an enlarged scale, taken on the line IV—IV of FIG. 1, FIG. 5 is a front elevation as seen in the direction indicated by the arrow V of FIG. 1, FIG. 6 is a rear elevation as seen in the direction indicated by the arrow IV of FIG. 1, and FIG. 7 is a partial side elevation as seen in the direction indicated by the arrow VII of FIG. 1.

Referring to the drawings, the implement which is illustrated has a frame 1 which includes two substantially horizontally disposed frame beams 2 that are spaced apart from one another. The beams 2 extend longitudinally of the implement and are perpendicularly interconnected by a beam 3 (FIGS. 4 and 6) near the rear of the implement and are similarly interconnected by a frame beam 4 (FIGS. 3 and 5) towards the front of the implement. Four beams 5 that are of channel-shaped cross section interconnect the beams 2 between the beams 3 and 4, the beams 5 extending parallel to the beams 3 and 4. The parallel beams 5 are equidistantly spaced from one another but the foremost beam 5 is at a considerably greater distance from the beam 4 than is the rearmost beam 5 from the beam 3. The beams 5 support a floor 6 across the upper surface of which the upper run of an endless conveyor 7 is movable. Two parallel endless chains 8 are arranged in relatively spaced relationship so as to pass around pairs of chain sprockets 9 fastened to shafts 10 that extend parallel to the beams 3 and 4 adjacent the foremost and rearmost ends of the floor 6. The shafts 10 are rotatably journaled in the beams 2 and the chains 8 carry, at regularly spaced intervals along their lengths, beams 11 of channel-shaped cross section, said beams 11 being arranged to extend parallel to the shafts 10 and to have the free edges of their flanges projecting upwardly from the floor 6 when said beams are disposed above that floor. The beams 11 constitute bale-catching members. A beam 12 (FIG. 3) of inverted L-shaped cross section perpendicularly interconnects the two frame beams 2 immediately in front of the foremost one of the two shafts 10. A substantially horizontal plate 13 is supported by the beam 12 and by the upper edges of leasing regions of the two frame beams 2, said plate 13 effectively constituting a substantially coplanar forward extension of the floor 6. As can be seen in FIG. 3 of the drawings, the plate 13 extends up to the leading ends of the two beams 2 at which point a central region thereof is formed with a downwardly bent over lip.

An axle 15 of square cross section is connected to the leading ends of the two frame beams 2 by supports 14 (FIG. 5). Two ground wheels 16 are rotatably mounted at opposite ends of the axle 15.

A support 17 projects upwardly from approximately the midpoint of the frame beam 2 and is inclined rearwardly from said beam with respect to the intended direction of operative travel of the implement. The upper end of the support 17 carries a horizontally rearwardly projecting portion 18 the rearmost end of which carries a vertical sleeve bearing 19. A vertical shaft 20 is turnable in the bearing 19 and its lowermost end carries a castor fork 21 between the limbs of which a castor ground wheel 22 is rotatable about the axis of a horizontal axle.

It can be seen from the drawings that the frame beams 2 support walls, said walls including upwardly and outwardly projecting portions 23 which merge into substantially vertical portions 24 (see FIG. 6). The overall height of the portions 23 and 24 progressively increases in a direction that extends forwardly of the implement away from the beam 3. The rearmost edges of the wall portions 23 are secured to an inclined rear wall 25 whose lowermost edge is fastened to the beam 3. At the leading ends of the two wall portions 23, adjacent the ground wheels 16, said portions are bent over towards one another to form wall portions 26, the leading edges of these two portions being connected to the opposite edges of a vertical front wall 27. The upper edge of the front wall 27 is bent over rearwardly of the implement to form an inclined wall portion 28 whose shape can be seen best in FIG. 3 of the drawings. The inclined wall portion 28 extends rearwardly of the implement to a location beyond the beam 4 at which location it is joined by a bent over wall portion 29 (FIG. 3).

It can be seen from FIG. 5 of the drawings that the front wall 27 is formed with a central oblong opening 28A whose lowermost edge substantially coincides with that of said wall 27. It can also be seen from FIG. 5 of the drawings that the longer sides of the oblong opening 28A are vertically disposed. The aforementioned downwardly bent over lip formed in a central region of the leading edge of the plate 13 is in register with the lowermost edge of the oblong opening 28A. Beams 29A of generally L-shaped cross section reinforce the opposite vertical edges of the opening 28A.

Brackets 30, 31, 32 and 33 are arranged one above the other at opposite sides of the opening 28A, the shape of said brackets being seen best in FIG. 2 of the drawings in respect of the uppermost brackets 33. The lowermost brackets 30 bear against the plate 13 and slots 34 (FIG. 3) are formed between the vertically spaced brackets. All of the brackets converge towards one another from the beams 29A to a region in which they are curved over in relatively opposite directions to terminate in straight portions extending perpendicular to the frame beams 2. These straight portions are fastened to beams 35 of generally L-shaped cross section fastened to opposite portions 23 of the wall of the implement. It can be seen from FIGS. 3 and 5 of the drawings that the edges of the brackets 30 to 33 which define the slots 34 are bent over to form substantially horizontal lips. The uppermost brackets 33 are secured to the lowermost edge of the bent over wall portion 29.

The shape and arrangement of the brackets 30 to 33 is such that a passage 30A (FIG. 2) is formed between them, said passage 30A progressively narrowing in width in a direction extending forwardly of the implement away from the leading end of the floor 6 until a narrow throat is formed from which, considered in the same direction, said passage progressively widens again to terminate in the opening 28A. Vertical stub shafts 36 (FIG. 3) are fastened to the beam 4 adjacent the opposite ends thereof and project upwardly therefrom through openings in the plate 13, the upper ends of the stub shafts 36 being disposed at the concave sides of the respective sets of brackets 30 to 33 and approximately coincident with the centers of curvature of the curved portions of those brackets. The upper ends of the stub shafts 36 carry bearings 37 about which vertically disposed tubes 38 are rotatable. The upper ends of the tubes 38 are rotatably mounted in bearings 39 carried by supports 40 that project rearwardly of the implement from a beam 41 which extends parallel to the beam 4 between opposite wall portions 26 of the implement.

At the levels of the three slots 34, each tube 38 carries a group of tines or pins 42. As can be seen in the drawings, the tines or pins 42 of each group are arranged in a cruciform relationship which is such that, upon rotation of the corresponding tube 38, their tips will move through the circular paths 43 shown in broken lines in FIG. 2 of the drawings. The tines or pins 42 project through the slots 34 into the passage 30A and said tubes 38, together with the tines or pins 42, afford tined rollers which are located at opposite sides of the passage 30A between the respective sets of brackets 30 to 33.

Substantially perpendicularly above the beam 41, a further beam 44 extends parallel to the beam 41 between opposite wall portions 26 of the implement. Vertical plates 45 (FIGS. 2 and 3) are arranged parallel to one another and are spaced apart at opposite sides of the midpoints of the two beams 41 and 44, said plates 45 being fastened to the beams 41 and 44 and being disposed above the passage 30A. Horizontal stub shafts 47 are carried by regions of the two plates 45 that are furthest from the beams 41 and 44, the stub shafts 47 carrying toothed pinions 48 closely adjacent the two plates 45. The teeth of the pinions 48 mesh with those of further pinions 49 mounted on a shaft 51 that extends parallel to the common axis of the shafts 47 and which is rotatably mounted in the plates 45. The two pinions 48 are interconnected by a horizontal stub shaft 52 adjacent their peripheries and a horizontal sleeve 53 is turnable thereabout between the two pinions 48. The sleeve 53 carries two downwardly projecting tines 54 that are spaced apart from one another. The sleeve 53 also carries a single arm 55 between the two tines 54, said arm 55 being in line with the tines 54 as seen in FIG. 3 of the drawings. The end of the arm 55 that is remote from the sleeve 53 is pivotally connected by a horizontal pin 56 to a pair of links 57 whose opposite ends are secured to a horizontal sleeve bearing 58 (FIG. 2). The sleeve bearing 58 surrounds a removable pin 59 which extends parallel to the stub shafts 47. As well as being entered through the sleeve bearing 58, the pin 59 can be entered through any chosen pair of two rows of holes 60 formed in upper edges of the two plates 45. It will be noticed that the two rows of holes 60 are curved and that the centers of curvature thereof are coincident with the axis of the shafts 47. The movements of the tips of the tines 54 can be varied, during operation of the implement, by engaging the removable pin 59 in different pairs of the holes 60.

An opening (for the tips of the tines 54) is formed in a lower edge region of the downwardly bent over portion 29 of the walls of the implement and a horizontal bar 61 of L-shaped cross secton is secured to said portion 29 a short distance above the opening. Brackets 62 and 62A (FIGS. 2 and 3) of approximately U-shaped configuration have their uppermost ends secured to the bar 61 from which they are curved around the peripheries of the pinions 48 to terminate in straight portions whose leading ends are secured to the beam 41. The brackets 62 and 62A are spaced apart from one another by slots 64 through which the tines 54 project during parts of their movement in the use of the implement. The brackets 62 and 62A afford major portions of the roof of the aforementioned passage 30A. Vertical knife blades 30B are arranged in pairs in the passage 30A at approximately the region of minimum width of that passage. Said blades 30B are arranged in pairs in the passage 30A at approximately the region of minimum width of that passage. Said blades 30B extend between the brackets 62 and 62A at opposite sides of the slot 64 and the floor plate 13 of the implement. The two blades 30B of each pair are located at opposite sides of one of the slots 64.

The shaft 51 extends throughout a greater part of the width of the implement and carries sprockets 65 linked by transmission chains 66 to larger sprockets 67 carried by short shafts 68 rotatably mounted in bearings carried by the aforementioned supports 40. Each shaft 68 carries a corresponding worm 69 which cooperates with the teeth of a corresponding worm wheel 70A fastened to the top of one of the tubes 38 and arranged internally of a corresponding gear box or gear casing 70.

Pairs of relatively spaced parallel vertical plates 71 project forwardly of the implement from the beams 41 and 44 at locations adjacent the opposite ends of those beams. A horizontal shaft 72 extends between the two plates 71 of each pair, said shafts 72 projecting through holes 71A in the portions 26 of the walls of the implement. Each shaft 72 carries a pulley 73 and each pulley 73 is in driven communication with a smaller pulley 75 mounted on the shaft 51 by way of a corresponding V-belt, rope or the like 74. The two pulleys 75 are located adjacent the opposite ends of the shaft 51, horizontal bearings 51A carried by the beam 44 being arranged to support the shaft 51 adjacent the two pulleys 75. Each shaft 72 has a second pulley 76 mounted alongside the pulley 73, the pulleys 76 having the same diameters as the pulleys 75. Each of the two ground wheels 16 has a pulley 78 secured to its hub and each pulley 78 is in driven communication with a corresponding one of the pulleys 76 by way of a V-belt, rope or the like 77. Two horizontal bearings 79 are rigidly connected to the upper side of the beam 44 adjacent the opposite ends of that beam and a rod 80 that extends parallel to the beam 44 is turnably received in said bearings. The rod 80 is provided with pairs of lugs 81 at positions close to the two bearings 79, the free ends of said lugs supporting horizontal shafts 82 about which rollers 83 are rotatable between the two lugs 81 of each pair. The two rollers 83 are disposed immediately above the upper runs of the corresponding two V-belts, ropes or the like 74 at positions between the pulleys 73 and 75.

The shaft 51 carries a sprocket 84 alongside one of the two vertical plates 45 and this sprocket is in driven connection, by way of a transmission shaft 85, with a sprocket 86 fastened to the output shaft 87 of a small internal combustion engine 88. The engine 88 is secured to a horizontal plate 89 the leading edge of which is fastened to the front wall 27 of the implement and the rearmost upwardly turned-over edge of which is fastened to the beam 41. The plate 89 bears downwardly upon the uppermost brackets 33 and its rearmost edge adjoins the leading ends of the brackets 62 and 62A so that its lower surface forms part of the roof of the passage 30A. A sleeve 90 is mounted on the shaft 51 close to the sprocket 84 and is arranged so as to be slidable axially of said shaft but nonrotatable relative thereto. This is accomplished with the aid of splines of the like which are not shown in detail in the drawings. The end of the sleeve 90 which is closest to the sprocket 84 is formed with recesses arranged to cooperate with facing projections on the hub of the sprocket 84. It will be understood that the sprocket 84 is mounted on the shaft 51 so as to be rotatable relative thereto but substantially axially immovable therealong. The surface of the sleeve 90 is formed with two axially spaced flanges and the limbs of a fork 91A engage loosely in the annular groove defined by said flanges at diametrically opposite points. The fork 91A is carried at one end of an arm 91 turnable about a pivot carried by the beam 44. It will be noted that the parts 90 and 84 together constitute a dog clutch.

The end of the arm 91 which is remote from the fork 91A is pivotally connected to one end of a horizontal coupling rod 92 whose opposite end is, in turn, pivotally connected to the free end of one arm of a bellcrank lever 93 whose fulcrum is afforded by a substantially vertical pivot mounted on the beam 44. The free end of the other arm of the bellcrank lever 93 is pivotally connected to the leading end of a coupling rod 94 whose rear end is pivotally connected to one arm of a further bellcrank lever 95 (FIGS. 2 and 7). The bellcrank lever 95 is turnable about a substantially horizontal pivot 95A mounted on a vertical portion 24 of the walls of the implement and its other arm is linked by a coupling rod 96 to one arm of a bellcrank lever 97. It can be seen in FIG. 7 of the drawings that the coupling rod 96 passes through a hole in an inclined portion 23 of the walls of the implement. The bellcrank lever 97 is turnable about a substantially horizontal pivot 97A carried by the last-mentioned portion 23 of the walls. A coupling rod 98 that extends longitudinally of the implement links the lower arm of the bellcrank lever 97 to one corner of a triangular plate 99 which is turnable about a pivot 100 connected to the frame 1. An inclined coupling rod 102 connects a further corner of the plate 99 to a control arm 103 pivotally mounted on a steering arm 105 of the implement with the aid of a pin 104.

The horizontal rod 80 (FIG. 2) to which the rollers 83 are connected carries a downwardly projecting arm 106 (FIG. 7) at one end, the lowermost end of the arm 106 being linked by a coupling rod 107 to an arm of a crank lever 108. The crank lever 108 is turnable about a substantially horizontal pivot 109 and its other arm is linked by a coupling rod 110 to an arm of a bellcrank lever 111. The bellcrank lever 111 is turnable about a pivot 112 and its other arm is linked by a cable 113 to a control lever 114 mounted on the steering arm 105.

The endless conveyor 7 is driven by the leading one of the two shafts 10 and, to this end, one end of the shaft 51 (FIG. 2) carries an eccentric about which a ring 115 (FIGS. 2 and 7) is rotatable. A rod 116 projects from the ring 115 and its opposite end is connected to one arm of a crank lever 117 that is turnable about the same pivot 109 as the crank lever 108. A coupling rod 118 connects the other arm of the crank lever 117 to one arm of a bellcrank lever 119 that is turnable about a substantially horizontal pivot 120. The other arm of the bellcrank lever 119 is linked by a short rod 121 to an arm 122 of a pawl and ratchet mechanism 122A, said mechanism 122A being mounted at one end of the leading one of the two shafts 10. An arm 123 is provided for actuating the pawl and ratchet mechanism 122A, the free end of said arm 123 being connected by a cable 124 to an adjusting lever 125 mounted on the steering arm 105 of the implement in association with a retaining gate.

In the use of the fodder loosening implement which has been described, a number of bales of fodder are stored in a reservoir on the endless conveyor 7 between the walls of the implement. When the engine 88 is operating, the control arm 103 can be operated to move the sleeve 90 axially of the shaft 51 to engage the dog clutch and cause the sprocket 84 to rotate said shaft 51. This rotation is transmitted to the tined rollers afforded by the parts 38 and 42 in such a way that they turn in the opposite directions A indicated by arrows in FIG. 2 of the drawings. The form of the transmission between the engine 88 and the tined rollers is such that their speed of rotation is quite slow. The toothed pinions 48 are also rotated about the stub shafts 47 so that the tips of the gripper tines 54 move through the approximately kidney-shaped paths 59A indicated by a broken line in FIG. 3 of the drawings. The adjusting lever 125 is employed to move the upper run of the endless conveyor 7 forwardly of the implement. This movement is quite slow and is derived from the pawl and ratchet mechanism 122A driven by the eccentric mounted internally of the ring 115 surrounding the shaft 51. As a bale of hay or other fodder moves slowly into the passage 30A as shown in FIG. 3 of the drawings, it is engaged by the tips of the tines 42 as they rotate slowly in the directions A through the circular paths 43. It is noted that the minimum width of the passage 30A is substantially less then the width of the bales and it is preferred that said bales should have approximately double the width of the throat of the passage 30A.

During the slow movement of a bale into the passage 30A, the much more rapidly moving gripper tines 54 are repeatedly drawn forwardly of the passage 30A through the bale and tear fodder loose therefrom at each such movement. The bale is thus progressively torn to pieces as the slowly moving tines 42 hold it whilst the rapidly moving tines 54 perform the repeated tearing action. The knife blades 30B, which are already detachable, cut any fodder which is pushed thereagainst by either the tines 42 or the tines 54. It will be remembered that the shape of the paths 59A (FIG. 3) can be changed to some extent by entering the removable pin 59 in different pairs of the holes 60. The principal alteration which this effects is to move said paths 59A forwardly of the implement from the position shown in FIG. 3 of the drawings. The extent and speed of loosening of the bales can thus be adjusted. If desired, a receiving region of a conveyor belt may be positioned immediately in front of the opening 28A and this belt may be arranged to transport loosened fodder to a stable or other feeding site for farmyard animals. Under these circumstances, a semiautomatic system is obtained which only needs the control of an operator who can manipulate the various arms and levers 103, 114 and 125.

The implement may operate from a fixed site or can propel itself with the aid of its ground wheels 16 and 22. When forward movement of the implement is required, the operator moves the lever 114 to press the rollers 83 downwardly into engagement with the upper runs of the V-belts, ropes or the like 74, these latter being arranged so that they normally slip relative to at least one of the pulleys 73 and 75. However, upon tightening of the V-belts, ropes or the like 74, the shafts 72, which project through the oblong holes 71A in the portions 26 of the walls of the implement rotate and cause the transmission belts, ropes or the like 77 that are located externally of said walls to drive the ground wheels 16. The steering arm 105 and castor wheel 22 make it simple for an operator walking behind the implement to guide it accurately along, for example, a corridor between two rows of cows or other animals. The implement passes over the loosened fodder which is discharged forwardly thereof from the opening 28A and the animals may eat this fodder as soon as the implement has moved beyond them.

It will be apparent that the fact that the width of the passage 30A is smaller than the width of the bales of fodder is sufficient to retain said bales in positions in which the gripper tines 54 can tear fodder therefrom. Although the particular form of tined roller which has been described has been found to be advantageous, it will be evident that other forms may be employed using, for example, resilient tines or other members which move the bales slowly through the passage 30A whilst simultaneously retaining the bales against being drawn forwardly through the passage by the gripper tines 54 during their fodder-tearing movements. If desired, the gripper tines 54 may be augmented by a knife designed to cut through lengths of string or other material employed to bind the bales of fodder.

Instead of an internal combustion engine 88, an electric motor may be used in which case it is desireable that the motor should be provided with a long length of cable arranged on an automatically winding cable or the like.

I claim:

1. A self-propelled implement for loosening baled fodder comprising a frame mounted on wheels and a conveyor floor having at least the width of a bale and being movable in a substantially horizontal direction, an outlet passage for loosened fodder being located in said implement near the delivery end of said floor, the size of said passage being smaller than the normal size of the bales being processed, rotatable tined retaining members being mounted at opposite sides of said passage, vertically movable loosening means being positioned between said retaining members and adjacent the upper regions of said retaining members, control means adjacent the loading end of said implement, said control means being connected to a source of power to regulate the movements of said retaining and loosening means and to control the rate of rotation of said wheels that propel the implement.

2. An implement as claimed in claim 1 wherein said loosening means is a plurality of members mounted to reciprocate whereby said loosening members are vertically movable through a bale of fodder to loosen same during movement.

3. An implement as claimed in claim 1, wherein the retaining members include two independent sets of members rotatable in relatively opposite directions and including tined rollers.

4. An implement as claimed in claim 3, wherein each tined roller has a plurality of groups of tines lying one above the other, the tines in each group being arranged in cruciform relationship.

5. An implement as claimed in claim 3, wherein the tines of said rollers are radially disposed and are rotatable about substantially vertical axes.

6. An implement as claimed in claim 3, wherein said tines of said tined rollers project into the passage through slots formed in its walls.

7. An implement as claimed in claim 1, wherein said loosening means has tips that are movable in paths that extend into said outlet passage.

8. An implement as claimed in claim 1, wherein said loosening means has members pivotable about a shaft whose axis extends substantially perpendicularly transverse to the direction of displacement of the bales into said outlet passage.

9. An implement as claimed in claim 1, wherein the fodder-loosening means comprises a plurality of loosening tines connected to a crank mechanism.

10. An implement as claimed in claim 9, wherein the tips of said loosening tines trace approximately kidney-shaped paths during operation.

11. An implement as claimed in claim 9, wherein said loosening tines are moved through slots in a roof portion of said outlet passage between said retaining members and the tines of said retaining members also project into said passage.

12. An implement as claimed in claim 1, wherein said floor is an endless conveyor for feeding bales to said loosening means and, viewed lengthwise of the upper run of said endless conveyor, said fodder-loosening means is located approximately centrally of said conveyor.

13. An implement as claimed in claim 12, wherein said endless conveyor is located at the bottom of a reservoir for bales of fodder, said fodder-loosening means being located at one end of said reservoir.

14. An implement as claimed in claim 12, wherein the delivery end of said endless conveyor adjoins the beginning of said outlet passage into which the bales are moved for loosening during operation.

15. An implement as claimed in claim 1, wherein pairs of knife blades are located in said outlet passage, said knife blades being substantially vertically disposed.

16. An implement as claimed in claim 15, wherein at least one pair of knife blades is arranged in said outlet passage in relatively spaced relationship.

17. An implement as claimed in claim 16, wherein said knife blades are releasably mounted in said passage.